United States Patent [19]

Diaz et al.

[11] Patent Number: 5,744,431

[45] Date of Patent: *Apr. 28, 1998

[54] CONDUCTIVE LUBRICANT FOR MAGNETIC DISK DRIVES

[75] Inventors: Arthur Fred Diaz, San Jose; Robert D. Johnson, Morgan Hill; Thomas Edward Karis, San Martin; Holayanahally S. Nagaral, Morgan Hill, all of Calif.; My Thanh Nguyen, Montclair, N.J.

[73] Assignee: International Business Machines Corporation, Armonk, N.Y.

[ * ] Notice: The term of this patent shall not extend beyond the expiration date of Pat. No. 5,641,841.

[21] Appl. No.: 749,711

[22] Filed: Nov. 15, 1996

Related U.S. Application Data

[60] Continuation of Ser. No. 479,496, Jun. 7, 1995, abandoned, which is a division of Ser. No. 370,594, Jan. 10, 1995, abandoned.

[51] Int. Cl.[6] .................................................. C10M 151/04
[52] U.S. Cl. .................................................. 508/410
[58] Field of Search ................................. 508/410

[56] References Cited

U.S. PATENT DOCUMENTS

| | | | |
|---|---|---|---|
| 4,144,178 | 3/1979 | Katabe et al. | 252/8.9 |
| 4,892,670 | 1/1990 | Mendelson | 252/37 |
| 5,071,445 | 12/1991 | Oppenlaender et al. | 44/408 |
| 5,095,076 | 3/1992 | Clement et al. | |
| 5,262,195 | 11/1993 | Moss et al. | |
| 5,283,278 | 2/1994 | Daire et al. | 524/399 |
| 5,380,591 | 1/1995 | Keogh et al. | 428/379 |
| 5,382,632 | 1/1995 | Patil et al. | |
| 5,403,913 | 4/1995 | MacDiarmid et al. | |
| 5,436,317 | 7/1995 | Järvinen et al. | |
| 5,448,440 | 9/1995 | Law et al. | 360/132 |

*Primary Examiner*—Jerry D. Johnson
*Attorney, Agent, or Firm*—Douglas R. Millett; Charles D. Gunter; Andrew J. Dillon

[57] ABSTRACT

An improved disk drive system using a non-ferrofluid conductive lubricant is disclosed. In the disk drive system, there is a plurality of critically spaced magnetic disks rotated by a disk motor. A spindle shaft, which is retained by the spindle sleeve, couples to the disk motor and to the plurality of magnetic disks for rotation. The spindle shaft and spindle sleeve uses a bearing, which is lubricated by a non-ferrofluid conductive lubricant. The lubricant is used to prevent electrostatic charge build up during operation of the disk drive system. The lubricant may be either a non-polar oil or a ball bearing grease and further comprising either a metal caged fullerenes compound, STADIS-450, ASA-3, or Polyfloe 130. One particular type of lubricant is an emeraldine salt of polyanilin produced according to the steps of first reacting a solution of HCL and ammonium persulfate into a solution of HCL and analine to form a polymer. Next, the polymer is mixed with ammonium hydroxide and then is prepared to have a molecular weight of 1,000–20,000. Finally, the polymer is mixed with dodecyl benzylsulfonc acid or camphor sulfonic acid until the emeraldine salt is formed.

3 Claims, 5 Drawing Sheets

CONDUCTIVE LUBRICANT FOR MAGNETIC DISK DRIVES

This application is a continuation of application Ser. No. 08/479,496, filed 7 Jun. 1995, now abandoned, which is a divisional application of Ser. No. 08/370,594, filed 10 Jan. 1995, now abandoned.

BACKGROUND OF THE INVENTION

1. Technical Field:

The present invention relates in general to spindle motors for disk drives, and, more specifically, to ball bearings and oil bearings for such spindle motors. More specifically, the present invention relates to disk drive ball bearing and oil bearing spindles containing antistatic additives.

2. Description of the Related Art:

Computer disk drives, such as hard disk drives, use a motor to turn a magnetic platter at high speeds. The motor typically includes a spindle, which is made of a number of metallic materials, plastics and elastomers, that requires lubrication during operation. One solution is to use oil bearings. These oil bearings typically include a pair of magnetic fluid seals, several capillary holes or channels, and a magnetic fluid for lubrication, which flows within these capillary channels and is held in place by the magnetic fluid seals. An alternative spindle bearing system uses grooved hydrodynamic bearings lubricated by a low viscosity hydrocarbon fluid. The more conventional spindle designs utilize two ball bearings usually straddled across either side of the motor stator that is press fit onto the shaft. Unfortunately, the fluids usually lack adequate conductive properties and static charge typically builds up that can ruin the head disk assembly, or read or write heads used in the hard disk devices.

For example, a voltage difference between the heads and disks can provide a potential energy that can harm the sensitive components in the disk drive assembly, such as the magneto resistive (MR) heads and the disk media itself. Although the initial voltage differences can be kept to near to zero, certain charging mechanisms inside the head disk assembly (HDA) allow voltage differences to build up.

One example of static build up occurs at two important interfaces inside the HDA. The first interface is between the heads and the disk. The second interface is between the moving and stationary parts of the spindle bearing system itself. When surfaces rub against each other in a bearing, some electron and ion exchange or charge separation is expected. This is known as tribocharging. Even occasional contact of asperities on the heads and disks can generate this tribecharge. Due to the very close proximity of surfaces in a disk drive platter, even a small charge imbalance forms potential differences on the order of volts, which is sufficient enough to destroy the HDA.

Additional methods by which damaging overcharge occurs is by the shearing of air molecules in the boundary layer adjacent to the rotating surfaces. Bonds are broken at the lubricated interfaces in the spindle bearing system, which is further degraded by the continuous charge separation occurring inside the HDA. From a design standpoint, charging rate and the impedance across the bearings, both head-disk air bearing and the spindle bearing, govern the system performance. A high charging rate is dangerous when the impedance is high because of build up that is sufficient in its potential difference to ruin the HDA. Accordingly, it is known to keep the impedances as low as possible when designing the spindle bearings.

The grease and the oil used in the bearings typically are dielectric. Due to the charging that takes place as described above, charge accumulation takes place at the heads, or spindle, and disk platters, which generates an electrical potential difference between the heads and the disk platters. The air gap between the head and disk platter is on the order of tens of nanometers, so a small electrical potential difference results in a significant electric field gradient. When a sufficient electric field gradient exists, the charge dissipates across the air gap between the head and the disk. The discharge damages the read/write electronics.

In the case of an oil bearing spindle design, one solution to provide protection against the static build up is to have separate electrically conductive ferrofluid seals, in which the fluid is electrically conductive. Unfortunately, the ferrofluid seals require a considerable amount of space in the spindle cavity and do not provide reliable low spindle resistance. Additionally, as the form factor size of disk drive systems gets smaller and smaller, the technology reaches the limitations of the ferrofluid seal solution and so an alternative solution is necessary.

Accordingly, what is needed is a spindle motor assembly that uses an oil bearing having sufficient antistatic properties so as to provide sufficient conductivity for dissipating the charge through the oil rather than through the head disk interface. What is also needed is a method of overcoming the problems inherent with the ferrofluid bearing solution. Alternatively, what is needed is a spindle motor assembly that uses a ball bearing with sufficiently enhanced conductivity by virtue of using grease having sufficient antistatic properties.

SUMMARY OF THE INVENTION

It is therefore one object of the present invention to provide spindle motors for disk drives.

It is another object of the present invention to provide shaft oil bearings for such spindle motors.

It is yet another object of the present invention to provide a disk drive oil bearing spindles containing antistatic additives.

It is yet another object of the present invention to provide a disk drive ball bearing spindle containing antistatic additives.

The foregoing objects are achieved as is now described. According to the present invention, an improved disk drive system using a non-ferrofluid conductive lubricant is disclosed. In the disk drive system, there is a plurality of critically spaced magnetic disks rotated by a disk motor. A spindle shaft, which is retained by the spindle sleeve, couples to the disk motor and to the plurality of magnetic disks for rotation. The spindle shaft and spindle sleeve uses a bearing, which is lubricated by a non-ferrofluid conductive lubricant. The lubricant is used to prevent electrostatic charge build up during operation of the disk drive system. The lubricant may be either a non-polar oil or a ball bearing grease and further comprising either a metal caged fullerenes compound, STADIS-450, ASA-3, or POLYFLOE 130. One particular type of lubricant is an emeraldine salt of polyanilin produced according to the steps of first reacting a solution of HCL and ammonium persulfate into a solution of HCL and analine to form a polymer. Next, the polymer is mixed with ammonium hydroxide and then is prepared to have a molecular weight of 1,000–20,000. Finally, the polymer is mixed with dodecyl benzylsulfonc acid or camphor sulfonic acid until the emeraldine salt is formed.

The emeraldine salt is based upon equal amounts of solutions of about 1.2M HCL containing 0.1M ammonium persulfate and about 1.2M HCL dissolved with about 0.1M aniline. This solution is then neutralized to form the polymer, by constantly stirring at about 0° C. for about 20 hours. The lubricant is formed by adding about 3 parts of the emeraldine salt to about 100 parts of polyolefin oil and bathing the mixture for a length sufficient enough to absorb the emeraldine salt in the oil and then removing any insoluble particles.

A conductive grease is formed by mixing an antistatic additive with a non-ferrous oil lubricant until the additive is dissolved therein and then thickening the lubricant until it forms a conductive grease. In addition to the previously named additives, additional additives include a 24% solution of 1-decene polysulfone and 2.7% solution of dicocodimethylammonium nitrite in toluene. A second type of antistatic additive is a colloidal solution selected from the group consisting of alkylsalicylates, sulfonates, succinimides or other polar additives. Additional antistatic additives include a magnesium oleate, calcium salt of nitrate lube oil with 10% stearic acid, 25-30% solution of chromium salts of $C_{17}$–$C_{20}$ synthetic fatty acids in toluene, chromium stearate, chromium salt long chain acid, chromium oleate, chromium linoleate, cobalt naphthenate, copper naphthenate, nickel naphthenate, diethylamine, 2-methylpyridine, 3-methylpyridine, 2-amino-5-nitropyridine, and 2,6-dinotro-3-chloropyridine. Other antistatic ingredients include SIGBOL, ASP-1, or KEROSTAT.

The conductive grease may also be manufactured by mixing the antistatic additive in a cosolvent until dissolution, adding the mixture to a fully formulated grease, and then evaporating the cosolvent. Additionally, the conductive grease may be manufactured by mixing the antistatic additive directly with a fully formulated grease and then heating and stirring the mixture until a homogenous mixture is obtained.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
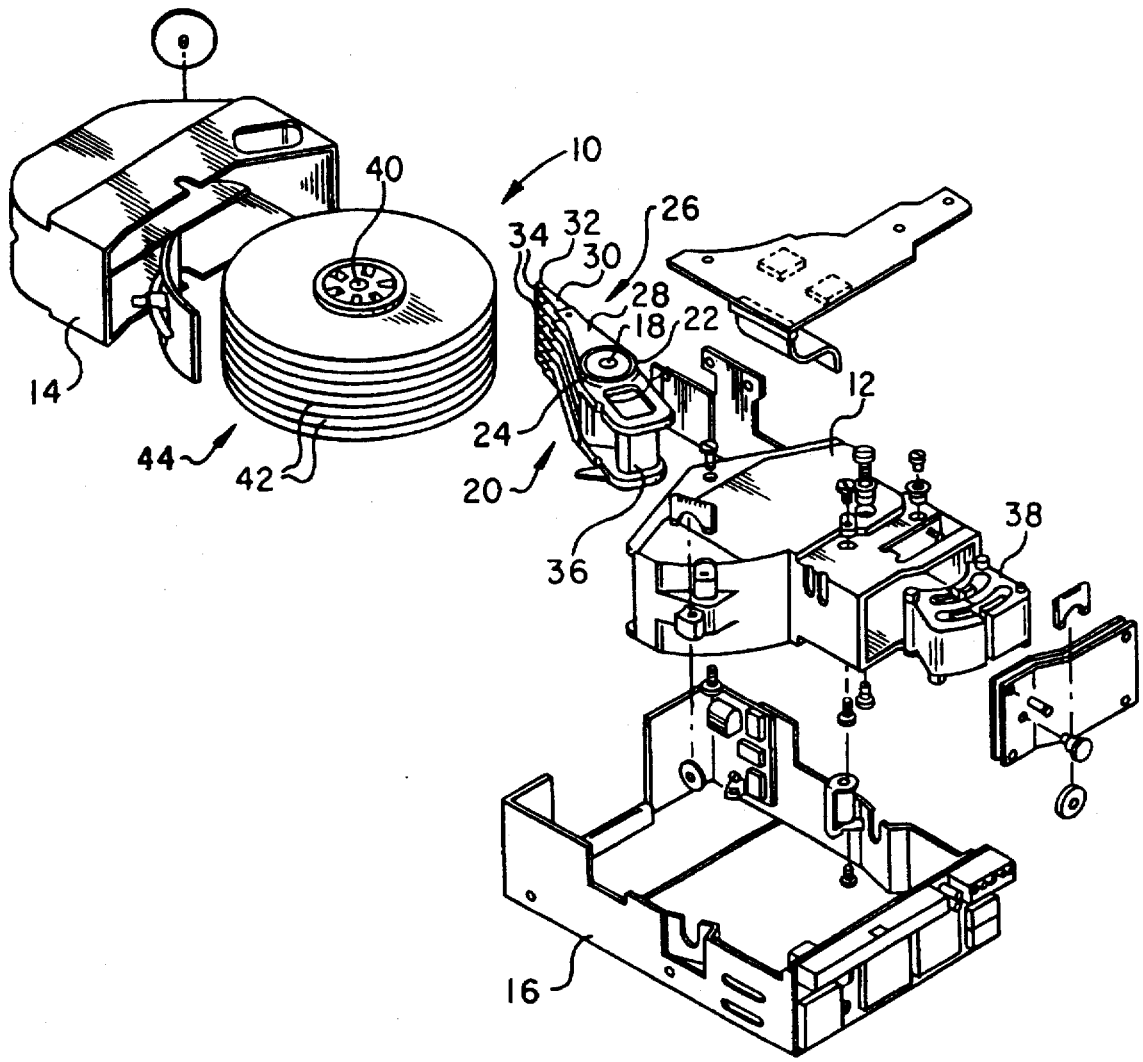
FIG. 1 is an exploded view of a representative disk drive system.

With reference now to the figures and in particular with reference to FIG. 1, there is depicted an exploded view of a typical disk drive system or disk drive 10. It should be noted that although a rotary actuator is shown, the invention described herein is applicable to linear actuators.

The disk drive 10 includes a housing 12, a housing cover 14, which after assembly is mounted within a frame 16. Rotatably attached within the housing 12 on an actuator shaft 18 is an actuator assembly 20. One end of the actuator assembly 20 includes an e-block or actuator hub 22 having a plurality or radially extending actuator arms 24. Attached to the separate actuator arms 24 of hub 22 are head gimbel assemblies 26. Each head gimbel assembly 26 includes a mounting plate 28 attached to actuator arm 24. Attached to the end of the mounting plate 28 are one or two beams 30. Attached at the end of each load beam 30 is a slider 32, which carries a pair of magnetic transducers or read/write head 34. On the other end of the actuator assembly 20, opposite the load beams 30 and the sliders 32 is a rotating means for rotating hub 22. The rotating means is shown as a voice coil 36, which is attached to actuator hub 22 and magnetics 38, which are attached in housing 12. The magnetics 38 and the voice coil 36 are the key parts of a voice coil motor that applies a force to the actuator assembly 20 to rotate it about the actuator shaft 18. Mounted within housing 12 is a spindle shaft 40. Rotatably attached to spindle shaft 40 are a number of vertically spaced apart magnetic disks 42. The vertically spaced apart and aligned magnetic disks 42 define a disk stack 44. An internal disk motor 52 (shown in FIG. 2) rotates the disk 42. The disk drive assembly 10 also has control circuitry for controlling the disk motor and the voice coil motor to allow selective positioning of the read/write heads 34 over disks 42.

Figure 2:
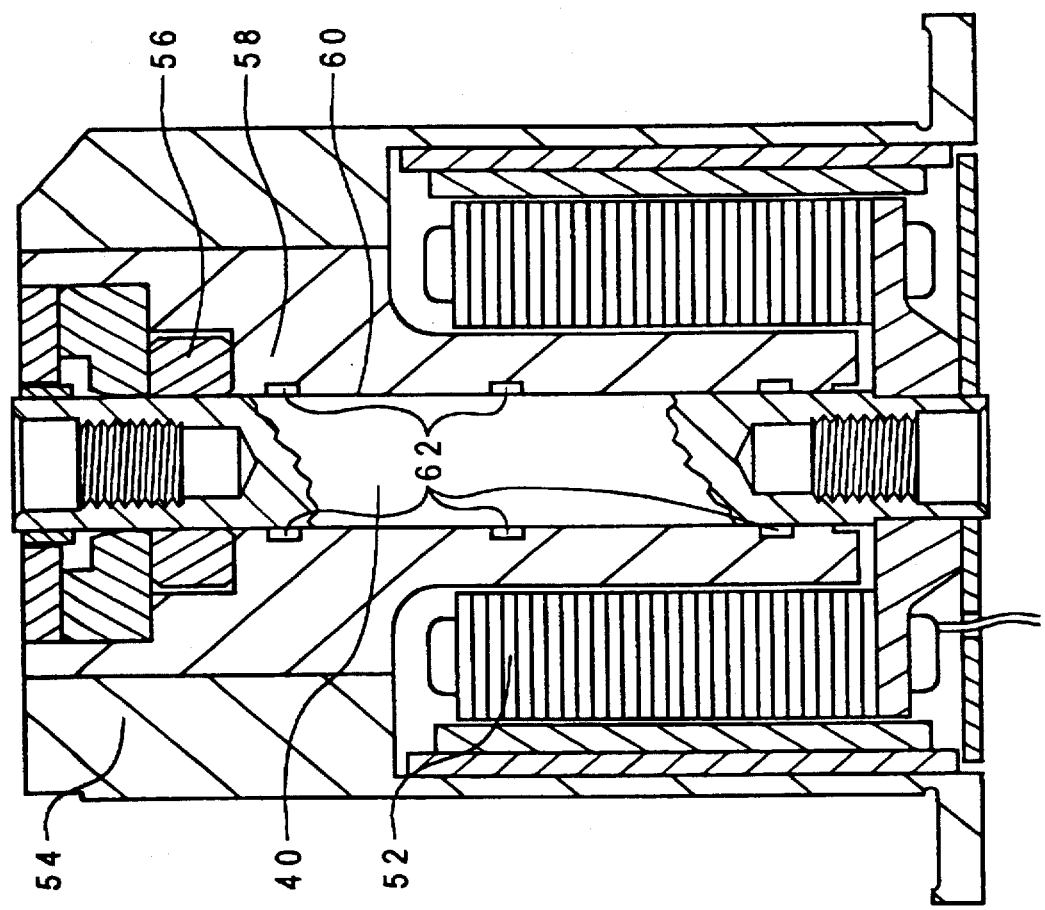
FIG. 2 is a cut-a-way side view of the disk drive spindle-motor assembly according to the present invention.

FIG. 2 details part of the disk stack drive assembly comprising the internal disk motor 52 and spindle shaft 40. The drive motor 52 is encased in hub 54. A thrust bearing 56 fits over spindle shaft 40 to provide axial load support and stiffness. The spindle shaft 40 further fits within sleeve 58, which further encases drive motor 52. During operation, drive motor 52 causes spindle shaft 40 to rotate at extremely high rpms such that a lubricant is necessary to allow free rotation of spindle shaft 40 with respect to spindle sleeve 58. Accordingly, a journal bearing 60 is provided in which a lubricant, which emanates from lubricating capillaries 62 provides lubrication in the journal bearing 60 to reduce friction between spindle shaft 40 and spindle sleeve 58.

Typically, the lubricating material, such as a fine machine oil or the like, acts as a dielectric between the spindle shaft 40 and the rest of the motor assembly via spindle sleeve 58. The high rotational speeds lead to a static charge build up that, when discharged is capable of destroying the electronics associated with the read/write heads 34. Accordingly, a prior solution was to use ferrofluid seals, which were electrically conductive, to prevent static charge build up. Unfortunately, these ferrofluid seals require a large amount of space in the spindle cavity and do not provide reliable low spindle resistance. Further, the ferrofluids typically contain relatively large magnetic particles that lead to problems in small bearing gaps required in precision oil bearings.

To overcome the problems inherent in the ferrofluid lubricants and conductive fluids, a precision oil is used as the lubricant, which is made conductive, so as to able to discharge any static build up or to prevent any static build up in the first place. Specifically, a polar ionic organic compound becomes soluble in oil when attached to a long hydrocarbon chain. The polar species then can be dissolved in the non-polar oil. The polar molecule, such as a carboxylic or sulfonic acid, then disassociates in the oil, releasing ionic protons or ions, which carry the charge. The same effect is also accomplished by use of a metal salt, with the acid being the one with the long hydrocarbon chain. These techniques have been applied in the past in the petroleum industry in attempting to prevent fuel from igniting by the addition of antistatic additives. As disk drive assemblies become smaller and more compact due to the increased densities for storage, the prior systems of using the ferrofluid seals are no longer adequate. Accordingly, rather than preventing the fuel from exploding due to any static build up, the present invention looks to prevent static build up due to the rapidly moving parts and other factors as detailed in the prior art section. Accordingly, using fuel additives, such as those used in aviation fuels and the like, has led to a novel solution in the problem of finding an antistatic additive to the lubricating oil in the spindle drive assemblies. One such additive contemplated is the STADIS-450, manufactured by DuPont. When STADIS-450 is added in the parts per million level to the lubricating oil, it provides antistatic protection as well as, if not better than, the prior solutions of the ferrofluid seals. Additional benefits are gained in that the ferrofluid seals, which occupy a significant space within the spindle cavity are eliminated.

Useful antistatic additives are not limited to the STADIS-450 additive. Other antistatic additives are also contemplated as being applicable in mixing with the spindle bearing oil to make it conductive. These other additives can conduct either by ionic mobility or by electronic hopping, or a combination of both mechanisms. Usually, the species becomes disassociated, producing the pre-ion to carry the charge, although when they do not disassociate, the increase in conductivity is due to electron transport between molecules. The common feature among all is the use of a long hydrocarbon chain (or side chain) to render polar species or acids soluble in the non-polar oil. In a separate category, metal caged fullerenes may also be dissolved in oil to impart conducting properties. Additional examples of other antistatic additives that could be used in disk drive spindle bearings are:

(1) ASA-3, manufactured by Shell, which is a mixture of equal parts chromium dialkyl salicylate and calcium didecyl sulfosuccinate in copolymer of lauryl methacrylate and methyl vinyl pyridine. The primary dissociating constituent is the chromium dialkyl salicylate, which is stabilized by calcium didecyl sulfosuccinate.

(2) POLYFLOE 130, which is a 50% solution in aromatic solvents of a polymeric condensation product of N-tallow-1,3-diaminopropane and epichlorohydrin(3).

(3) 24% solution of 1-decene polysulfone and 2.7% solution of dicocodimethylammonium nitrite in toluene.

(4) Colloidal solutions of alkylsalicylates, sulfonates, succinimides or other polar additives.

(5) Magnesium oleate, calcium salt of nitrate lube oil with 10% stearic add, 25–30% solution of chromium salts of $C_{17}$–$C_{20}$ synthetic fatty acids in toluene, chromium stearate, chromium salt long chain acid, chromium oleate, chromium linoleate, cobalt naphthenate, copper naphthenate, nickel naphthenate, diethylamine, 2-methylpyridine, pyridine, 3-methylpyddine, 2-amino-5-nitropyridine, 2,6-dinitro-3-chloropyridine.

(6) SIGBOL, ASP-1, KEROSTAT (stearylanthranilic acid).

(7) Conducting polyaniline derivatives made soluble with long chain organic acid or hydrocarbon side chain.

(8) Metal ion containing fullerenes, $C_{60+n}M$ where n=0, 1, . . . and M=La, or any metal ion capable of electron transfer.

Figure 3:
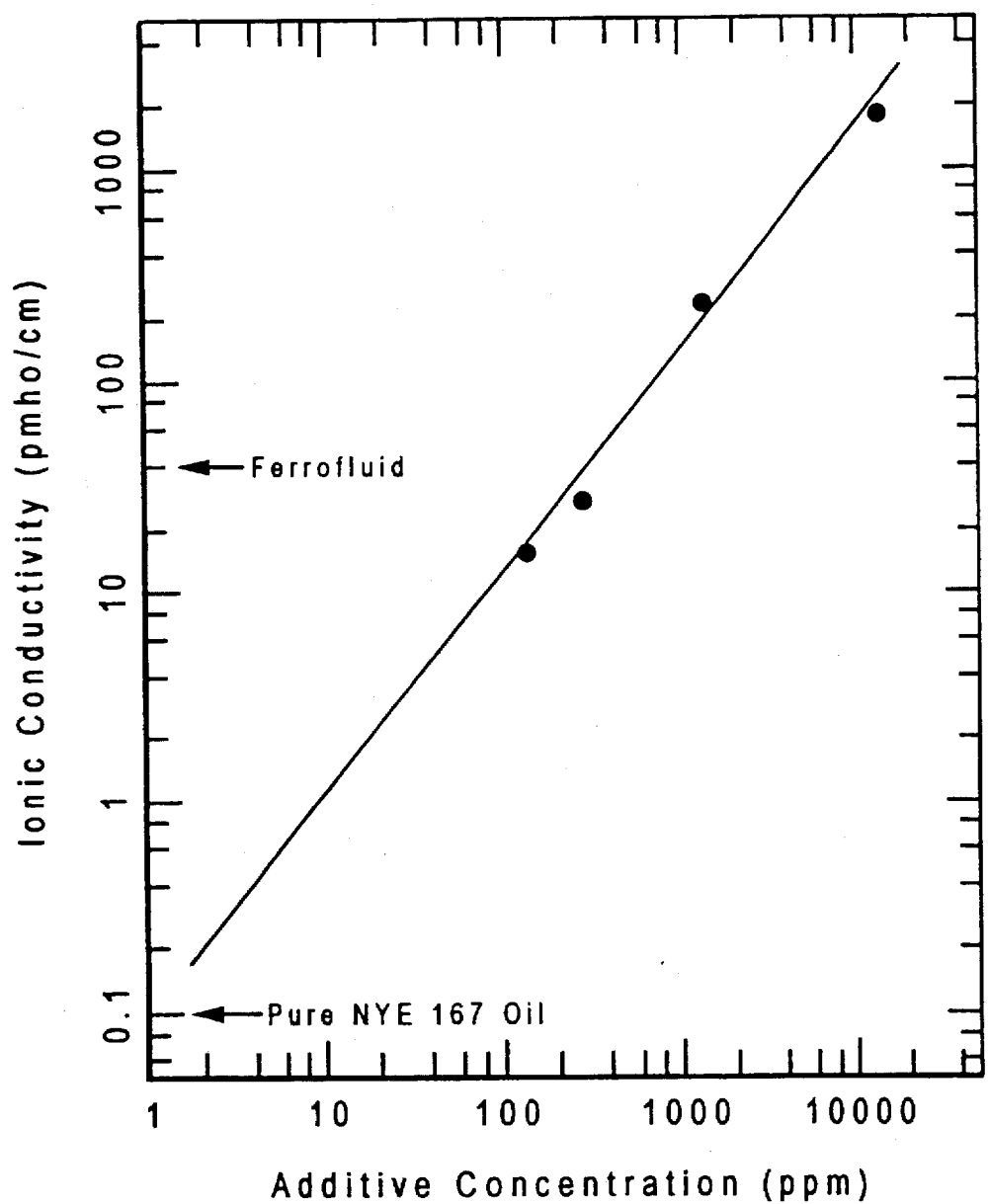
FIG. 3 is a graph of the conductivity of one type of lubricating oil as a function of antistatic additive concentration according to the present invention.

One lubricant typically used is NYE 167 A poly alpha olefin (PAO) oil, in which a range of antistatic additive concentrations using STADIS-450 were prepared. The ionic conductivity was measured at 50° C. with a single surface sensor. The conductivity as a function of antistatic additive concentration at 50° C. is shown in FIG. 3. FIG. 3 is a graph showing the ionic conductivity of the various lubricants, such as pure untreated NYE 167 oil, ferrofluid, and NYE 167 oil with respect to the concentration of the antistatic additives. Within this range of concentration, the conductivity is given by $\sigma$=approximately $381 \times C \times \exp(-2663.2/T)$ where $\sigma$ is the conductivity in pmho/cm, C is the antistatic additive concentration in ppm, and T is the absolute temperature in °K. This gives a conductivity activation energy of 22 kJ (5.3 kcal). The viscous flow activation energy for the PAO oil is 14.4 kJ (3.5 kcal). The similarity between the conductivity and flow activation energy is consistent with an ionic conduction mechanism. Metal caged fullerenes may increase conductivity by a charge shuttle mechanism through changes in the metal ion oxidation state.

The conductivity of the oil by itself is about 0.1 pmho/cm at 50° C. as measured at the low frequency of approximately $10^{-2}$ Hertz. The conductivity of the ferrofluid is approximately 40 pmho/cm and can be matched by the oil using only about 200 ppm of the additive STADIS-450. Further, since the additive is 60% toluene, which will volatize, there is actually only 80 ppm of additive active components.

The overall impedance of the oil may be more precisely calculated once the bearing dimensions are known. For example, in a 2.5 inch drive spindle, at a fluid conductivity of approximately 10 pmho/cm, the spindle resistance is approximately 20 Mohm. This spindle resistance is considered to be low enough to permit reliable operation of the head disk interface. On a prototype oil bearing spindle, the resistance was measured to 2 Gohms, which gives 0.1 pmho/cm for the oil conductivity with no additive. The fluid conductivity of approximately 10 pmho/cm can be obtained by adding about 100 ppm concentration of the STADIS-450. After the toluene is vaporized, the actual concentration of the active solids required amounts to 40 ppm at 50° C. or 150 ppm at 5° C. This low concentration has a negligible effect on the oil's viscosity. This additive provides reliable low spindle resistance for up to 10,000 start/stop cycles while continuing to provide electrostatic discharge capabilities.

Yet another, and preferred, conductive lubricant is now described, which is based on the new soluble polyaniline derivatives. The basic chemical structure is as follows:

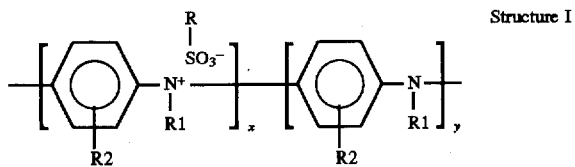

Structure I where R is dodecyl benzyl or camphor, $R_1$ is selected from the group of H, alkyl, benzyl, or allyl, and $R_2$ is selected from the group of H, alkyl, alkoxy, or halide, where $0<x/y<1$. The solution uses conducting additives in oil and grease for disk-drive applications, as well as for the conventional application in fuels and cleaning fluids, etc. In general, polyaniline has four different oxidation states. Treatment with the acid converts the base to the conductive salt form. The emeraldine salt is a good electrical conducting material with the conductivity between 5 and 100 S/cm. The leucoemeraldine, emeraldine base and pernigraniline are insulators. The emeraldine base of polyaniline and its derivatives are soluble in non-polar solvents, such as toluene, xylene, polyolefin oil, and synthetic greases after treatment with dodecyl benzylsulfonic acid or camphor sulfonic acid.

Synthesis of polyaniline and its derivatives:

The emeraldine salt of polyaniline and its derivatives are synthesized by the oxidative polymerization of the corresponding monomers in hydrochloric acid solution using ammonium persulfate as an oxidizing agent. A typical synthesis of the emeraldine salt of polyaniline is performed by slowly adding 50 ml of 1.2M HCl solution containing 0.1 mole ammonium persulfate into 50 ml of 1.2M HCl solution dissolved with 0.1 mole aniline under constant stirring at 0° C. for 20 hours. A dark green polymer precipitate forms and it is collected by filtration and washed with distilled water until the filtrate becomes neutral.

The emeraldine base of polyaniline and its derivative are obtained by stirring the emeraldine salt with 200 ml of 1.0M ammonium hydroxide solution for 5 hours. The polymer is then collected by filtration, washed copiously with distilled water then dried in vacuum at 25° C. to constant weight. The molecular weight of the polymers is about 1,000 to 20,000.

Preparation of conducting oil and grease:

The emeraldine base forms of polyaniline and its derivatives are mixed with dodecyl benzyl sulfonic acid at room temperature in an agate mortar and pestle to yield the emeraldine salt form. About 0.3 g of the resulting complex is mixed with 10 g of NYE 167 poly alpha olefin (PAO) oil. The mixture is then placed in an ultrasonic bath for at least 5 hours. Any insoluble particles are removed by centrifugation. A polyaniline derivative may also be dissolved in toluene and added to a synthetic grease (Li 12 hydroxy stearate soap/PAO oil). The solvent is removed in a vacuum oven at 60° C. until there is no more weight loss.

Lubricating grease consists of a light oil and a thickener. The light oil is from 10 to 90 per cent of the total weight of oil plus thickener. The light oil typically consists of one from the group of mineral oil, polyalpha olefin, diester, or aliphatic ester of a polyol. The thickener is typically one from saponified rape seed oil, long chain organic acid metal salt complex soap (e.g. lithium 12-hydroxystearate), or a polyurea.

The addition of antistatic additive is known to provide conductivity to any of these oils, so incorporating the oil containing antistatic additive in a grease results in a conducting grease. The antistatic additive is incorporated into the grease easily in a number of ways. A few are listed here as examples.

1. The antistatic additive is dissolved in the oil during grease formulation. The oil containing the antistatic additive is then combined with the thickener or thickener-forming components and subsequently processed the same way as usual for that type of grease.

2. The antistatic additive is incorporated into the already fully formulated grease using a cosolvent method. In one approach, a cosolvent for the oil and antistatic additive, but a non-solvent for the thickener (e.g. hexane, toluene, . . . ) is added to the fully formulated grease. The cosolvent contains some of the antistatic additive. After allowing equilibration between the solvent, oil, and thickener, the cosolvent is removed by evaporation, leaving behind the antistatic additive containing oil in the grease. The amount of cosolvent should be between 5 and 20 per cent of the total grease weight, but always less than total volume of the oil to avoid altering the grease structure.

3. The antistatic additive may be incorporated directly into grease by heating and stirring.

These methods of preparing grease may be used to lower the resistance of a ball bearing containing the grease with antistatic additive dissolved in the oil. This is another means to achieve the low resistance of .ca 10 to 100 Mohms across the spindle and housing of a magnetic disk drive. This is used for the same purpose as the antistatic additive in the oil for the oil spindle bearings. Any of the same additives, and any others to achieve the same enhanced conductivity, can provide adequately low resistance.

Figure 4:
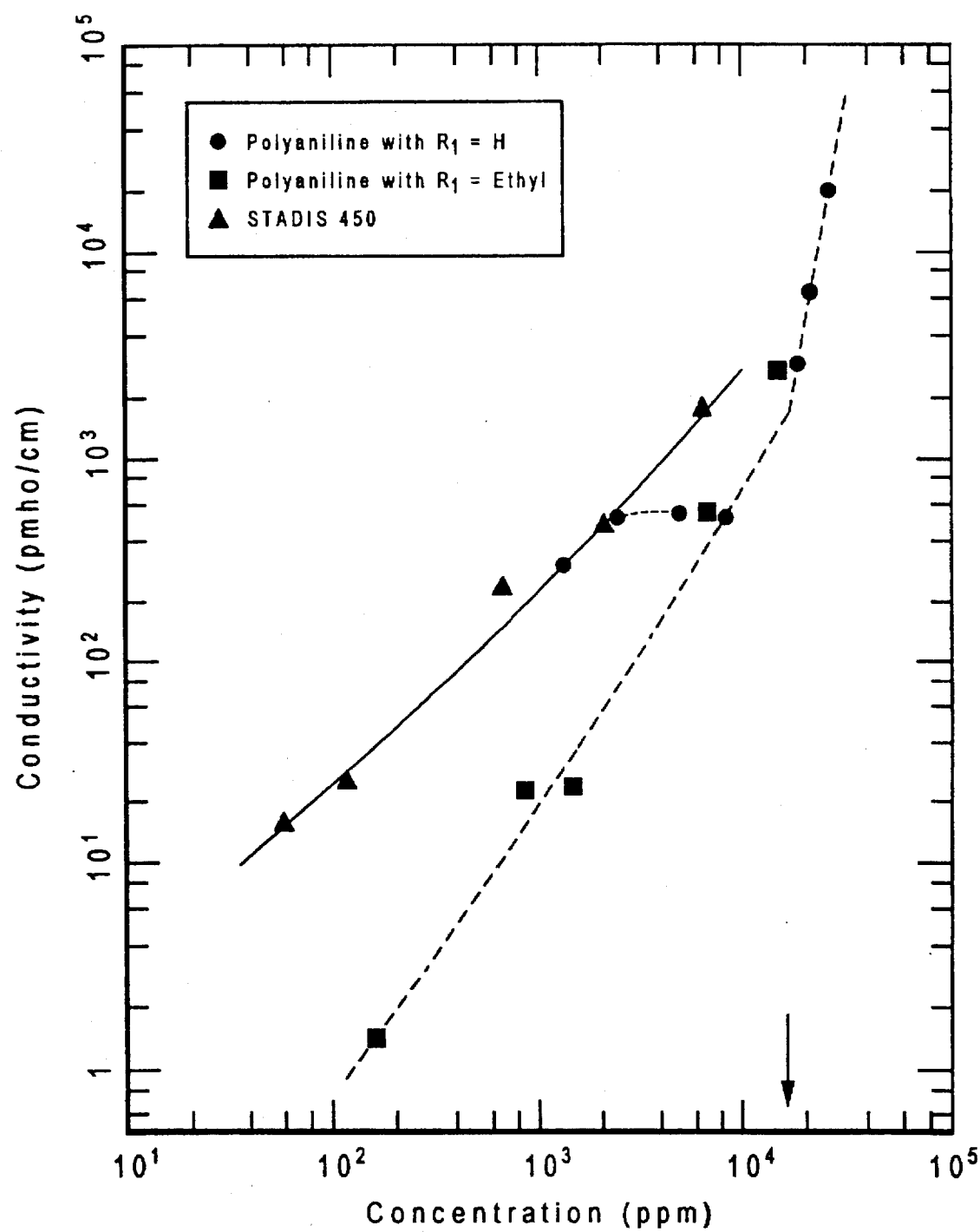
FIG. 4 is a graph of the conductivity of a second type of lubricating oil as a function of antistatic additive concentration according to the present invention.

Conductivity measurements:

Solutions of polyaniline antistatic additive with $R_1$=Ethyl or H, $R_2$=H and x=y in the PAO oil, which is currently used in oil bearings and grease, were prepared containing a range of concentration. The conductivity was measured using a DuPont dielectric analyzer at 50° C. with a single surface sensor. The conductivity of the solutions as a function of polyaniline antistatic additive concentration at 50° C. is shown in FIG. 4. Solutions of the polyaniline additive with various $R_1$, $R_2$ and x/y≠1 may also be prepared.

The conductivity of the commercially available STADIS-450 is also shown in FIG. 4 for comparison with the new polyaniline conducting polymer antistatic additives. There is an apparent percolation threshold for the polyanilines near $1.6 \times 10^4$ ppm (indicated by the arrow in FIG. 4). Above $1.6 \times 10^4$ ppm, the conduction mechanism becomes dominated by electronic hopping between the polymer chains. Below the percolation threshold, both ionic and electronic conduction are comparable. In the case of $R_1$=Ethyl, the slope below the percolation threshold is steeper than for the STADIS-450 due to the additive (or parallel) property of combined hopping and ionic conduction with the polyaniline derivative. The component polymers of the STADIS-450 are non-conducting. Below the percolation threshold, the equilibrium shifts towards more dissociation of the acid and towards the non-conducting form of the polyaniline, and the mechanism shifts to primarily ionic (dotted line in FIG. 4). The percolation threshold concentration can be lowered to obtain higher conductivity with a lower concentration of additive by proper selection of $R_1$ and $R_2$ in Structure I. This increases the solubility parameter and the dimension of the dissolved polymer chain, shortening the hopping distance at a fixed polymer concentration.

The conductivity versus temperature was measured to derive the activation energy for conductivity. This gives a conductivity activation energy of 22 kJ (5.3 kcal). The viscous flow activation energy for the PAO oil is 14.4 kj (3.5 kcal). The higher activation energy for conductivity than for flow is consistent with a combined ionic and electronic conduction mechanism.

A wide range of oil soluble polymers based on polyaniline were tested and found to be effective in increasing the oil conductivity, as shown in Table 1.

TABLE I

| Conductivity of oil containing different polyaniline derivatives at 50° C. | |
|---|---|
| Polymers | Conductivity (pmho/cm) |
| Polyaniline | 605 |
| Poly(N-propyl aniline) | 580 |

The conductivity of the oil by itself is about 0.1 pmho/cm at 50° C. as measured at the low frequency of (0.01–0.1 Hz). The conductivity of the ferrofluid is approximately 30–50 pmho/cm and is mentioned for comparison to the prior solution using the knowledge of the bearing dimensions, including the bearing gap, the overall impedance of the oil bearing spindle can be calculated. For 2.5 inch drive spindle, at a fluid conductivity of about 10 pmho/cm, the spindle resistance based on the geometry is about 20 Mohm. This spindle resistance is considered to be low enough to permit reliable operation of the head-disk interface. The fluid conductivity of 10–10,000 pmho/cm can be readily obtained using the soluble conducting polyaniline derivatives.

Spindle motors were prepared with NYE 167 Polyalphaolefin oil containing about 0.2 per cent of the active ingredients in DuPont STADIS 450 additive. The oil conductivity is a function of the additive concentration as shown in FIG. 4. The same motors were also prepared using a ball bearing with a ferrofluid seal, and using the same oil without any antistatic additive and a ferrofluid seal.

Figure 5:
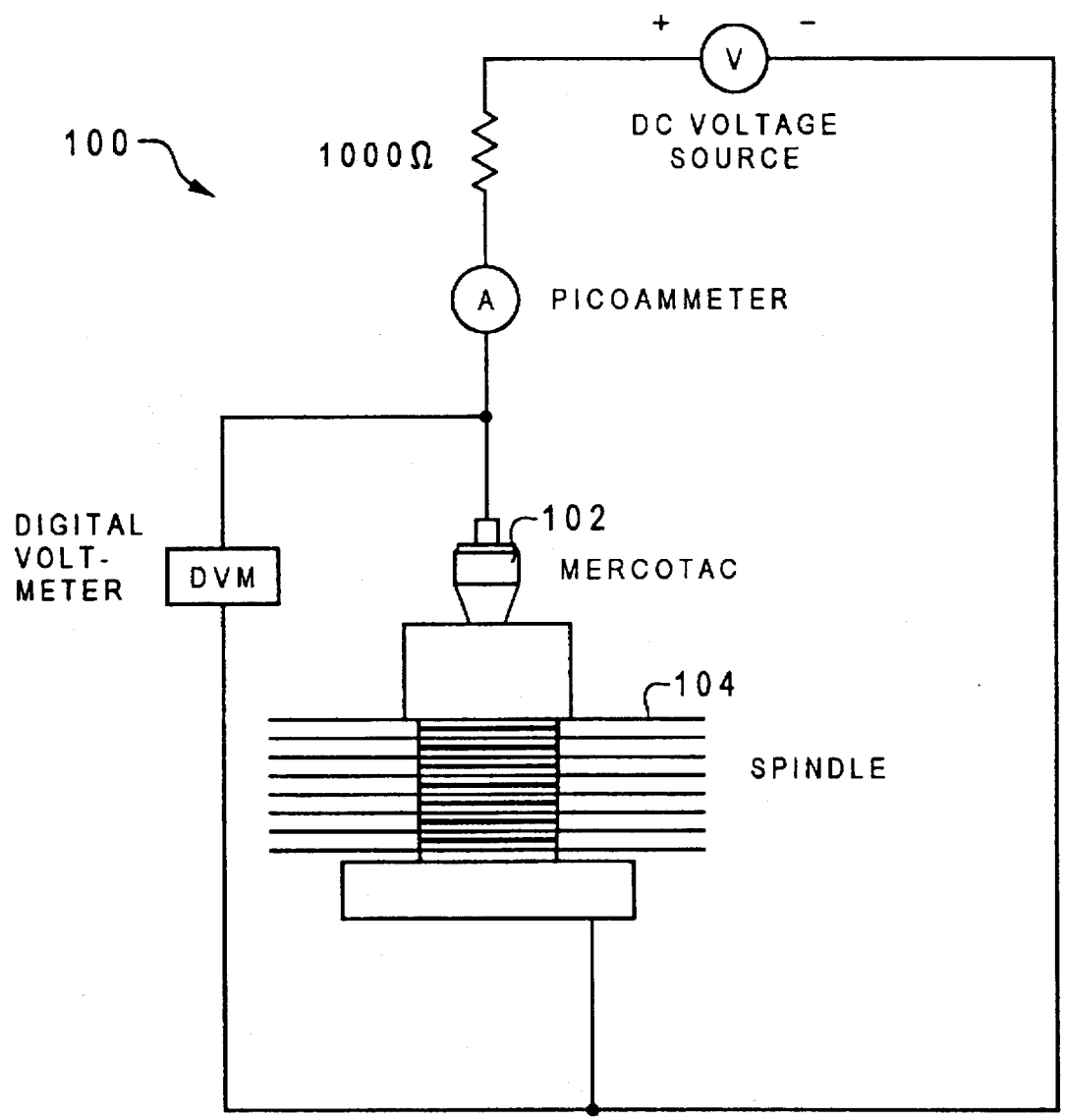
FIG. 5 is a schematic of the test setup used to measure the spindle resistance across the lubricant.

Since the spindle motor assembly must be rotating for the oil bearing to operate, a test rig 100 was set up using a Mercotac mercury pool contactor 102 to allow electrical connection to the rotating element. In the actual test setup, inertia rings were used to simulate the mass of the disk pack 104. A schematic of the test setup is shown in FIG. 5. A voltage between 0.1 and 1 volt was applied across the bearing, and the current through the bearing was measured with a picoammeter. The resistance was determined by dividing the instantaneous voltage by the current using a computer (not shown). The spindle resistance was then measured for the different configurations in order to demonstrate the workability of the current invention.

Spindle resistance measurements were done after various periods of steady rotation, and the results are shown in Table 2. High resistance was found with the ball bearing and with the untreated oil, both having ferrofluid seals. Initially, the ferrofluid seal provides low resistance, but with use, the ferrofluid separates from the contact zone, and does not provide an adequate path for conduction. In the ball bearing, the metallic components become separated by an elastohydrodynamic film of insulating oil. Sufficiently low spindle resistance is obtained only with the conducting oil bearing, and the ferrofluid seal is unnecessary. Three examples with separately built spindle motors are listed in Table 2, showing that the antistatic additive invention works in the real devices, and that the effect is reproducible.

TABLE 2

The spindle resistance showing the acceptable improvement obtained by using 0.2 percent STADIS 450 in NYE 167 PAO oil, Conducting Oil Bearing, over the high resistance of the alternative, Ball Bearing with Ferrofluid Seal, and Untreated Oil Bearing with Ferrofluid Seal. Resistance was measured as shown in FIG. 5.

| Lubricant System | Test Spindle | Run Time (days) | Spindle Resistance (Megohms) |
|---|---|---|---|
| Ball Bearing | 5 | .05 | 600 |
| with | 6 | .05 | 200–400 |
| Ferrofluid Seal | 7 | 1.5 | 200–400 |
|  | 4 | 1.5 | 100–200 |
| Untreated | 69 | 0 | 10–100 |
| Oil Bearing | 10 | 12 | 400–4,000 |
| with | 12 | 12 | 400–4,000 |
| Ferrofluid Seal | 310 | 13 | 400 |
|  | 311 | 13 | 100 |
|  | 9 | 51 | 2,000 |
| Conducting | 349 | 0 | 7 |
| Oil Bearing |  | 1.5 | 10 |
| without |  | 3.5 | 13 |
| Ferrofluid Seal |  | 18 | 20 |
|  | 342 | 0 | 4.4 |
|  |  | 3 | 15 |
|  |  | 6 | 10 |
|  |  | 21 | 20 |
|  | 340 | 0 | 10 |
|  |  | 0.5 | 15 |

TABLE 2-continued

The spindle resistance showing the acceptable improvement obtained by using 0.2 percent STADIS 450 in NYE 167 PAO oil, Conducting Oil Bearing, over the high resistance of the alternative, Ball Bearing with Ferrofluid Seal, and Untreated Oil Bearing with Ferrofluid Seal. Resistance was measured as shown in FIG. 5.

| Lubricant System | Test Spindle | Run Time (days) | Spindle Resistance (Megohms) |
|---|---|---|---|
|  |  | 1 | 22 |
|  |  | 9 | 30 |

While the invention has been particularly shown and described with reference to a preferred embodiment, it will be understood by those skilled in the art that various changes in form and detail may be made therein without departing from the spirit and scope of the invention.

We claim:

1. A process of preparing a disk drive conductive grease for use in a closed hard disk drive apparatus comprising the steps of:

mixing an antistatic additive with a non-ferrous oil lubricant until said antistatic additive dissolves therein;

adding a thickener to form a conductive grease, wherein said anti-static additive is a conducting polyaniline derivative made soluble with long chain organic acid or hydrocarbon side chain having the basic chemical structure:

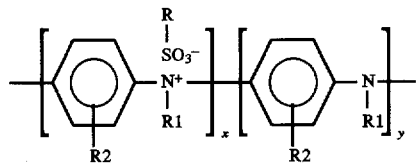

where R is selected from the group consisting of dodecyl benzyl and camphor; $R_1$ is selected from the group consisting of H, alkyl, benzyl, and allyl; and $R_2$ is selected from the group consisting of H, alkyl, alkoxy, and halide; where $0<x/y<1$.

2. A process of preparing a disk drive conductive grease for use in a closed hard disk drive apparatus comprising the steps of:

mixing an antistatic additive in a cosolvent until dissolution;

after dissolution, adding the mixture to a fully formulated grease; and evaporating said cosolvent, wherein said anti-static additive is a conducting polyaniline derivative made soluble with long chain organic acid or hydrocarbon side chain having the basic chemical structure:

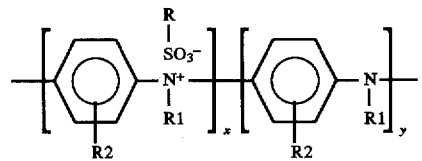

where R is selected from the group consisting of dodecyl benzyl and camphor; $R_1$ is selected from the group consisting of H, alkyl, benzyl, and allyl; and $R_2$ is selected from the group consisting of H, alkyl, alkoxy, and halide; where $0<x/y<1$.

3. A process of preparing a disk drive conductive grease for use in a closed hard disk drive apparatus comprising the steps of:

mixing an antistatic additive directly with a fully formulated grease; and heating and stirring said mixture until a homogenous mixture is obtained, wherein said anti-static additive is a conducting polyaniline derivative made soluble with long chain organic acid or hydrocarbon side chain having the basic chemical structure:

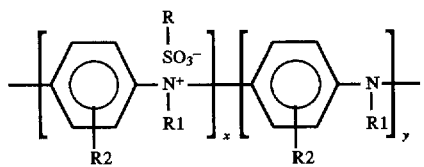

where R is selected from the group consisting of dodecyl benzyl and camphor; $R_1$ is selected from the group consisting of H, alkyl, benzyl, and allyl; and $R_2$ is selected from the group consisting of H, alkyl, alkoxy, and halide; where $0<x/y<1$.

* * * * *

UNITED STATES PATENT AND TRADEMARK OFFICE
CERTIFICATE OF CORRECTION

PATENT NO. :   5,744,431
DATED      :   April 28, 1998
INVENTOR(S) : Diaz et al.

It is certified that error appears in the above-identified patent and that said Letters Patent is hereby corrected as shown below:

Title page, Item [75] Inventors:  please change "Holayanahally S. Nagaral" to --Holyayanahally S. Nagaraj--.

Signed and Sealed this

Eleventh Day of August 1998

Attest:

BRUCE LEHMAN

*Attesting Officer*       *Commissioner of Patents and Trademarks*